Aug. 11, 1953    H. S. POND, JR    2,648,395
AIR CLEANER FOR INTERNAL-COMBUSTION ENGINES
Filed Jan. 30, 1951    2 Sheets-Sheet 1

INVENTOR.
HARRY S. POND, JR.
BY
McMorrow, Berman & Davidson
ATTORNEYS

Aug. 11, 1953     H. S. POND, JR     2,648,395
AIR CLEANER FOR INTERNAL-COMBUSTION ENGINES
Filed Jan. 30, 1951     2 Sheets-Sheet 2

INVENTOR.
HARRY S. POND, JR
BY
McMorrow, Berman + Davidson
ATTORNEYS

Patented Aug. 11, 1953

2,648,395

UNITED STATES PATENT OFFICE 2,648,395

AIR CLEANER FOR INTERNAL-COMBUSTION ENGINES

Harry S. Pond, Jr., Mobile, Ala.

Application January 30, 1951, Serial No. 208,633

4 Claims. (Cl. 183—22)

This invention relates to air-cleaning devices, and more particularly to an air-filtering and cleaning apparatus for use with an internal combustion engine for cleaning the air admitted into the carburetor of the engine for combustion of the fuel.

A main object of the invention is to provide a novel and improved air cleaner for internal combustion engines, said air cleaner being simple in construction, being easy to install on an engine, providing thorough cleaning of the air and providing clean air for combustion with a minimum amount of entrained moisture therein.

A further object of the invention is to provide an improved air cleaner for internal combustion engines of the type employing water as a cleaning medium, the air cleaner being inexpensive to manufacture, being sturdy in construction, and being easy to maintain in operating condition.

Further objects and advantages of the invention will become apparent from the following description and claims, and from the accompanying drawings, wherein:

Figure 1:
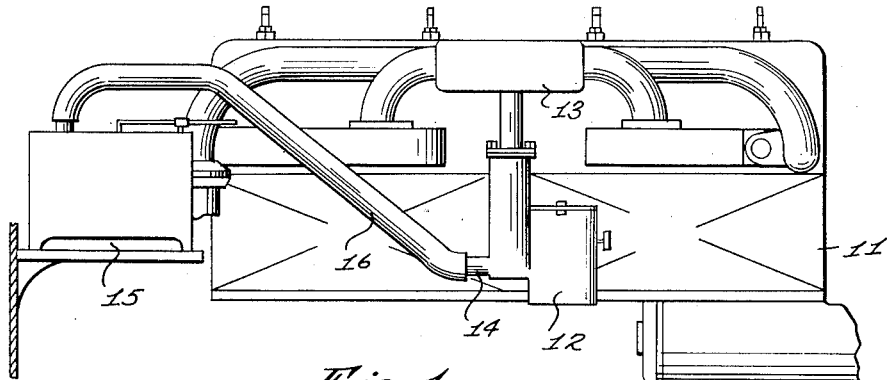
Figure 1 is a side elevational view of an internal combustion engine provided with an improved air cleaner constructed in accordance with the present invention.

Referring to the drawings, 11 designates a conventional internal combustion engine provided with the usual carburetor 12 whose outlet conduit is connected to the intake manifold 13. The air intake conduit of the carburetor is shown at 14, and designated at 15 is an air cleaner according to the present invention whose outlet conduit is connected to the air inlet conduit of the carburetor by a hose 16.

Figure 2:
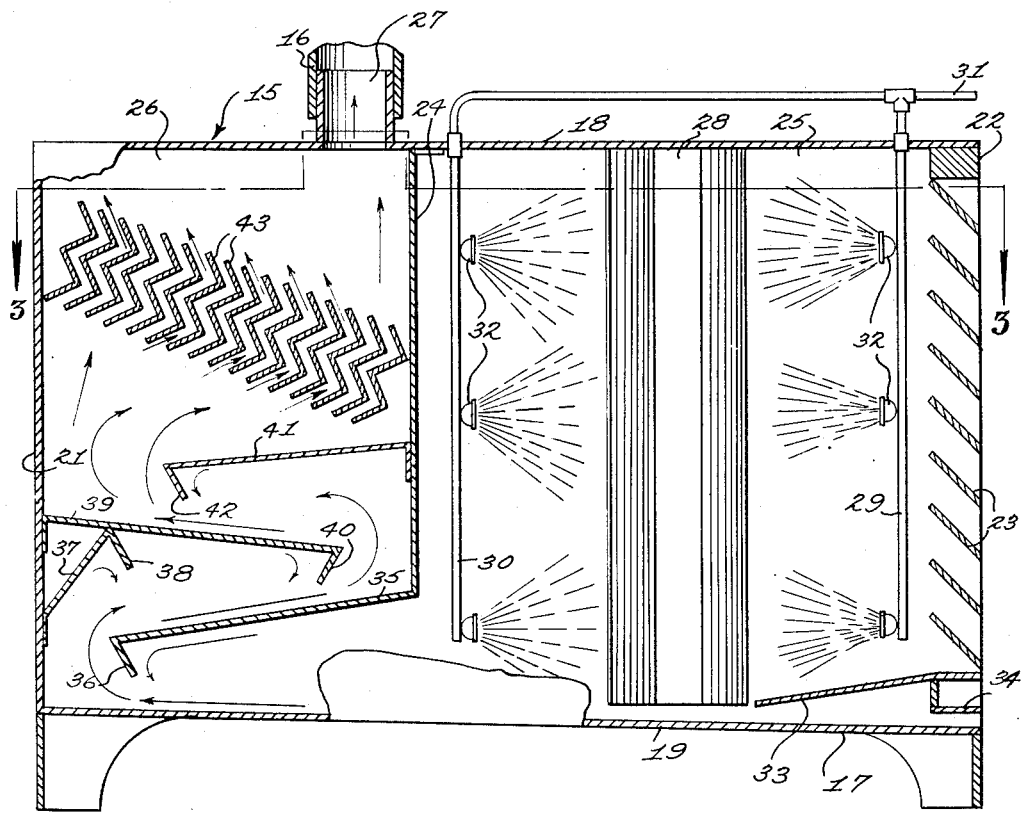
Figure 2 is a vertical, longitudinal, cross-sectional view taken through the air cleaner employed in Figure 1.
Figure 4:
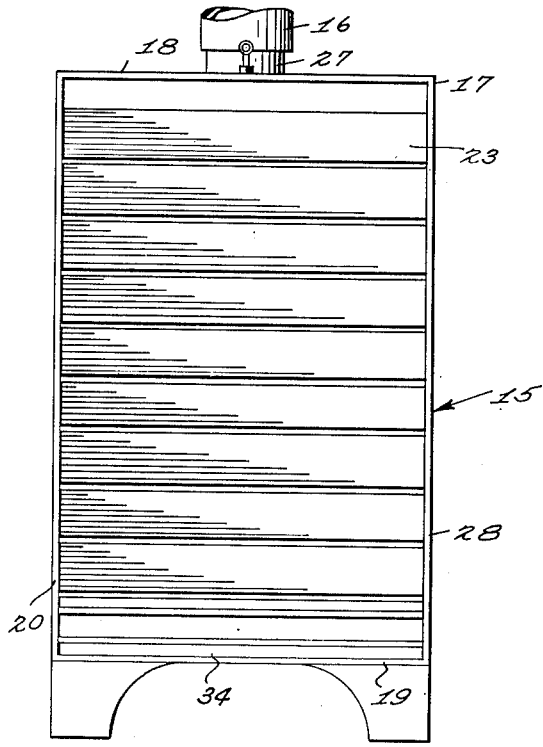
Figure 4 is a front end elevational view of the air cleaner of Figures 1, 2 and 3.

The air cleaner 15 comprises a generally rectangular housing 17 having a top wall 18, a bottom wall 19, side walls 20, 20, a rear end wall 21, and a louvered forward wall designated at 22. As shown in Figures 2 and 4, the forward wall 22 comprises the parallel, inclined, transverse louvers 23 which define air intake passages leading into the forward portion of the housing 17. Designated at 24 is a transverse partition wall secured in the intermediate portion of housing 17 and defining a first air-cleaning space 25 which is in communication with the passages defined between the louvers 23, and a second air-cleaning space 26 located rearwardly of the partition wall 24 and which is in communication with an air outlet conduit 27 provided in the rear portion of top wall 18.

Figure 3:
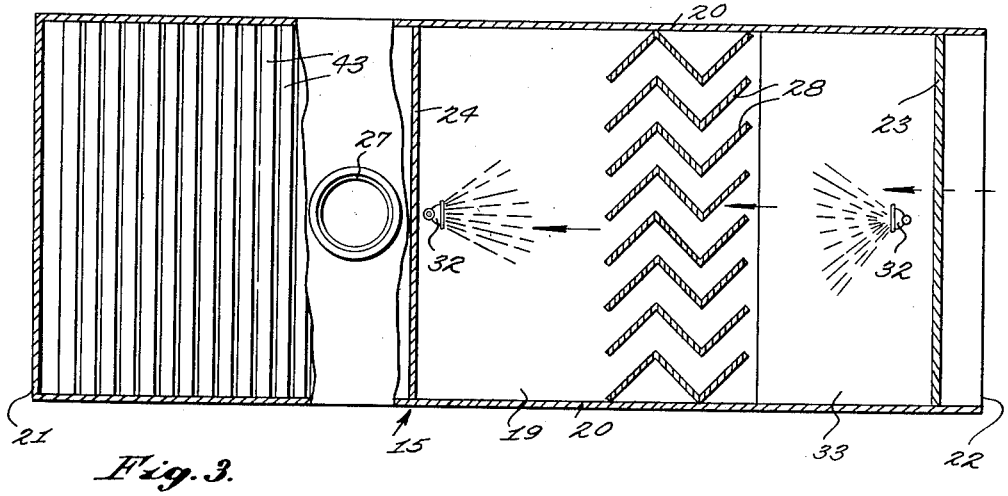
Figure 3 is a horizontal, cross-sectional view taken on line 3—3 of Figure 2.

Designated at 28 are a plurality of vertical, spaced parallel plate members which are secured in the intermediate portions of the first air-cleaning space 25, said plate members 28 being vertically corrugated, as shown in Figure 3, and defining tortuous air passages leading from the forward portion of space 25 to the rearward portion thereof. As shown in Figure 3, the plate members 28 are generally V-shaped in cross-section, defining parallel, vertical corrugations, as above described. Designated at 29 and 30 are respective vertical water supply conduits which extend through the top wall 18 of the housing 17, and which are connected to a water supply pipe 31, which in turn is connected to a suitable source of water, such as a tank or reservoir. Said tank or reservoir may be located at a suitable elevation relative to the conduits 29 and 30 to provide substantial pressure in said conduits, or alternatively, a suitable pump may be provided in the supply pipe 31 to furnish pressure in conduits 29 and 30. The conduits 29 and 30 are provided with spaced sprinkler heads 32 which provide water sprays when water under pressure is supplied through pipe 31 to the conduits 29 and 30. The lower portion of the space 25 is provided with an inclined drain plate 33, whereby the water sprayed in the space 25 may drain downwardly to the bottom wall 19, a discharge passage 34 being provided at the forward end of the housing 17, whereby the drain water may escape from the housing.

The transverse partition wall 24 is formed at its lower end with a rearwardly and downwardly inclined portion 35 which defines a rearwardly converging passage with respect to the bottom wall 19. The portion 35 is formed at its end with a downwardly and forwardly inclined flange element 36 which functions as an obstruction to entrap moisture entrained in the air traveling rearwardly through the passage thus defined. Secured to the rear wall 21 is an upwardly and forwardly inclined, transverse plate member 37 which defines a forwardly divergent passage relative to the plate member 35. Plate member 37 is formed at its end with a downwardly and forwardly inclined flange 38 which also functions as a trap to obstruct moisture entrained in the air flowing through the passage defined between plate member 37 and plate member 35. Designated at 39 is a forwardly and downwardly inclined, transverse plate member secured to rear wall 21 and to the top portion of plate member 37, as illustrated in Figure 2, and extending a substantial distance forwardly in overlying relationship to the downwardly and rearwardly inclined plate member 35, as shown. It will be apparent from Figure 2 that the plate member 39 defines a forwardly convergent air passage with respect to the plate member 35. The forward end of the plate member 39 is provided with a downwardly and rearwardly inclined flange 40 which functions as a trap to obstruct entrained moisture in the air flowing in the passage defined between plate member 39 and plate member 35. Designated at 41 is a downwardly and rearwardly inclined, transverse plate member secured at its rear end to the transverse partition wall 24, as shown, the plate member 41 defining a rearwardly convergent air passage with respect to the plate member 39. At the rear end of the plate member 41 a downwardly and forwardly inclined flange 42 is providing which serves as a trap to obstruct any residual entrained moisture in the air flowing through passages defined between plate members 41 and 39.

Designated at 43 are the transversely disposed, corrugated, parallel plate members which are arranged to define a screen between the portion of air space 26 below plate members 43 and the upper portion of said air space 26. As shown in Figure 2, the plate members 43 are generally W-shaped in cross-section and define tortuous passages therebetween. As further shown in Figure 2, the plate members 43 are disposed substantially diagonally between the upper rear corner of housing 17 and the corner defined between plate member 41 and partition wall 24.

In operation, water is admitted to the first air space 25 and provides sprays at the spray heads 32. Air is admitted between the louvers 23 and passes through the tortuous passages defined by the corrugated plates 28, the air being cleaned by the sprays before and after passing through said tortuous passages. As a result of the scrubbing treatment, most of the dust in the air is removed, but the air may contain some entrained particles of moisture. The air leaving the first air-cleaning space 25 passes between the inclined plate member 35 and the bottom wall 19, the rate of flow of the air being increased due to the convergency of the passage defined between plate member 35 and wall 19. The rate of flow of the air is somewhat decreased by passing through the divergent passage defined between plate member 37 and plate member 35, and is again accelerated by flowing through the passage defined between plate member 39 and plate member 35. The air is further accelerated by progressing through the convergent passage defined between plate member 39 and plate member 41, and emerges into the space below the corrugated screen plate 43. Most of the entrained moisture has been removed by engagement of the moving air with the trap flanges 36, 38, 40 and 42, and any residual moisture or dust particles are removed by the passage of the air to the final tortuous screen passages defined between the plate members 43. The air leaving the housing 17 is furnished to the carburetor 12 through the hose 16 in a condition substantially free of dust and moisture particles.

It will be noted that the inclined plates 41, 39 and 35 guide any moisture collected from the air downwardly to the bottom wall 19 where the moisture may be drained through the drain passage 34.

While a specific embodiment of an improved air cleaner for internal combustion engines has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An air cleaner for internal combustion engines comprising a housing having a front wall provided with air intake louvers, a transverse partition wall in said housing defining a first air-cleaning space communicating with said louvers, and a second air-cleaning space, means at the intermediate portion of said first air-cleaning space defining horizontally extending tortuous passages connecting the forward portion of said first cleaning space to the rearward portion thereof, respective water spray means in said forward and rearward portions, conduit means connecting said rearward portion to the second air-cleaning space, means in the intermediate portion of the second space defining upwardly extending tortuous passages between the lower portion of the second space and the upper portion thereof, and an air outlet conduit connected to the top wall of said second space.

2. An air cleaner for internal combustion engines comprising a housing having a front wall provided with air intake louvers, a transverse partition wall in said housing defining a first air-cleaning space communicating with said louvers, and a second air-cleaning space, water spray means in the forward portion of said first air-cleaning space, vertically extending baffle means in the intermediate portion of said first air-cleaning space defining tortuous passages connecting the forward portion of said first cleaning space to the rearward portion thereof, conduit means connecting said rearward portion to the second air-cleaning space, said conduit means comprising a first convergent passage, a divergent passage, a second convergent passage, and a third convergent passage, each of said passages being provided at the end thereof with a depending baffle plate element in partially obstructing relationship to said passage to entrap moisture particles in the air moving through the passages, means in the intermediate portion of the second space defining tortuous passages between the lower portion of the second space and the upper portion thereof, and an air outlet conduit connected to the top wall of said second space.

3. An air cleaner for internal combustion engines comprising a housing having a front wall provided with air intake louvers, a transverse partition wall in said housing defining a first air-cleaning space communicating with said louvers, and a second air-cleaning space, water spray means in the forward portion of said first air-cleaning space, vertically extending baffle means in the intermediate portion of said first air-cleaning space defining tortuous passages connecting the forward portion of said first cleaning space to the rearward portion thereof, conduit means connecting said rearward portion to the second air-cleaning space, said conduit means comprising a convergent passage and a divergent passage, at least one of said passages being provided at the end thereof with a depending baffle plate element arranged to entrap moisture particles in the air moving through the passages, means in the intermediate portion of the second space defining tortuous passages between the lower portion of the second space and the upper portion thereof, and an air outlet conduit connected to the top wall of said second space.

4. An air cleaner for internal combustion engines comprising a housing having a front wall provided with air intake louvers, a transverse partition wall in said housing defining a first air-cleaning space communicating with said louvers, and a second air-cleaning space, a first set of closely spaced substantially vertically extending parallel corrugated plate members secured in said first air-cleaning space defining tortuous passages and connecting the forward portion of said first cleaning space to the rearward portion thereof, respective water spray means in said forward and rearward portions of said first space, conduit means connecting said rearward portion to lower portion of the second air-cleaning space, said conduit means comprising a first convergent passage, a divergent passage, a second convergent passage, and a third convergent passage, each of said passages being provided at the end thereof with a depending baffle plate element arranged to entrap moisture particles in the air moving through the passages, a second set of closely spaced parallel corrugated plates secured in said second air-cleaning space and arranged to define tortuous passages therethrough between the lower portion of the second space and the upper portion thereof, and an air outlet conduit connected to the top wall of said second space.

HARRY S. POND, JR.

References Cited in the file of this patent

UNITED STATES PATENTS

| Number | Name | Date |
| --- | --- | --- |
| 701,074 | McCreery | May 27, 1902 |
| 885,185 | Serrell | Apr. 21, 1908 |
| 1,884,534 | Betz | Oct. 25, 1932 |
| 2,312,386 | Brady | Mar. 2, 1943 |
| 2,395,960 | Clark et al. | Mar. 5, 1946 |
| 2,471,724 | Christensen | May 31, 1949 |
| 2,483,509 | Soderman | Oct. 4, 1949 |
| 2,545,672 | Pearson | Mar. 20, 1951 |
| 2,583,390 | Paasche | Jan. 20, 1952 |

FOREIGN PATENTS

| Number | Country | Date |
| --- | --- | --- |
| 500,775 | France | Mar. 24, 1920 |